United States Patent

Kirschey

Patent Number: 5,545,089
Date of Patent: Aug. 13, 1996

[54] SHAFT COUPLING

[75] Inventor: Gerhard Kirschey, Wuppertal, Germany

[73] Assignee: Centa-Antriebe Kirschey GmbH, Haan, Germany

[21] Appl. No.: 218,326

[22] Filed: Mar. 25, 1994

[30] Foreign Application Priority Data

Mar. 26, 1993 [DE] Germany ............... 43 09 745.6

[51] Int. Cl.$^6$ ........................................ F16D 3/68
[52] U.S. Cl. ..................... 464/83; 464/85; 464/160
[58] Field of Search .................. 464/74, 76, 83, 464/150, 903, 85, 137, 73, 160, 51, 87, 89, 90, 180, 20

[56] References Cited

U.S. PATENT DOCUMENTS

| | | |
|---|---|---|
| Re. 33,249 | 7/1990 | Schneider .............. 464/137 X |
| 3,438,221 | 4/1969 | Paulsen ...................... 464/76 |
| 3,482,464 | 12/1969 | Reich et al. . |
| 4,011,737 | 3/1977 | Kruger et al. ............ 464/137 |
| 4,037,431 | 7/1977 | Sugimoto ................... 464/73 |
| 4,257,242 | 3/1981 | Domer et al. ............ 464/89 X |
| 4,551,115 | 11/1985 | Ferguson .............. 464/160 X |
| 4,779,470 | 10/1988 | Morita et al. ........... 464/76 X |
| 5,205,788 | 4/1993 | Sacher et al. .......... 464/160 X |
| 5,224,898 | 7/1993 | Johnson et al. .......... 464/74 X |

FOREIGN PATENT DOCUMENTS

| | | | |
|---|---|---|---|
| 0693993 | 7/1940 | Germany ................ 464/137 |
| 0248920 | 11/1986 | Japan .................... 464/137 |

*Primary Examiner*—Daniel P. Stodola
*Assistant Examiner*—William A. Rivera
*Attorney, Agent, or Firm*—Herbert Dubno; Andrew Wilford

[57] ABSTRACT

A two-stage shaft coupling has inner elastomeric bodies between polygonal surfaces of a hub and an opening in the flange and outer coupling members which come into play subsequently in windows elongated in the direction of rotation and spaced around the axis in the flange. The two sets of coupling elements are not axially offset to provide a relatively flat shaft coupling.

16 Claims, 13 Drawing Sheets

SHAFT COUPLING

FIELD OF THE INVENTION

My present invention relates to a two-stage elastic shaft coupling and, more particularly, to a shaft coupling of the type which can be used especially for the drive of a boat and has a drive-side coupling flange adapted to be connected to a driving element and a hub by which a shaft is connected to the flange through the intermediary of two groups of elastic elements.

BACKGROUND OF THE INVENTION

Two-stage rotary elastic shaft couplings for boat drives have been provided heretofore and reference may be made to the press release of the firm MERCRUISER. This coupling consists basically of a drive-side coupling flange and a driven-side hub connectable to a shaft and axially disposed in a central opening of the coupling flange. A secondary force-transmitting member is connected with the hub and has projections which are circumferentially or angularly spaced but extend parallel to the axis into openings in the coupling flange which are elongated in the circumferential direction.

These projections, which may be pins, function as claws engaging the coupling flange and may be referred to as such. Between the hub and the coupling flange two groups of elastic coupling elements are provided. The first, consisting of an elastic ring, is provided directly between the coupling flange and the hub. The second group of elastic coupling elements are disposed in the elongated openings in the coupling flange and are juxtaposed with the claws to engage them after there has been some relative angular displacement of the coupling flange and the hub.

The first elastic coupling element is softer and more pliable than the second group and the torque transmission at low torques or loads of the coupling and in idling or small partial loads can be effected exclusively by the first elastic coupling body from the coupling flange to the hub. Only with larger loads to full load and higher torque transmission is the second group of the torsionally stiffer elastic bodies automatically brought into play to participate in the torque transmission.

In practice it has been found that this prior art shaft coupling solves a problem which arises with shaft couplings of earlier designs at low loads or at idle, namely, the so-called gear hammering. Such noise arises when the elastic body is not soft or pliable enough. With the two stage MERCRUISER shaft coupling, the coupling flange is connected with the hub by an elastic rubber ring which is relatively pliable. The torque delivered by the flywheel of the boat motor is thus initially transmitted via this elastomeric ring to the hub with which the drive shaft is rotationally coupled. At idle and at low engine speeds, this elastic coupling element alone can serve to drivingly connect the flange with the hub.

The secondary force-transmitting member in this construction is a plate or disk-like member which has the aforementioned claws or pins on which elastomeric sleeves can be provided and which are torsionally stiffer than the elastomeric ring forming the first element. These pins with their sleeves engage in elongated openings of the coupling flange. As long as the drive torque remains in the idle or low-load range, the pins with their elastic sleeves are free to oscillate within the elongated openings and without impacting on the ends or flanks thereof.

With an increase in the driving torque and greater load or resistance at the driven side, the restoring force of the elastic ring is no longer able to maintain the pins free to oscillate and the pins with their sleeves are driven against the trailing flanks defining the respective openings. As a result, therefore, of the greater angular relative displacement of the flange and the hub, the elastomeric sleeves come into contact with edges of the respective openings and thus assume the force and torque-transmitting function.

A two-stage torsional elastic coupling of this type has a damping characteristic which, in the idle and low-load ranges, corresponds effectively only to that of the elastic ring and has a generally flat rise. This curve has a sharp break upward when the second group of torsionally stiffer elastic coupling members, namely the sleeves, comes into play.

This two-stage coupling has been found to substantially reduce the noise in the idle or low-load conditions for a shaft coupling. However, this prior shaft coupling is expensive and of complex construction. Mounting of the elastic ring by bolting or the like with the coupling flange and the hub is time-consuming and vulcanization techniques are even more complex and can render maintenance of the shaft coupling problematical. Mounting and assembly and disassembly are all time-consuming and difficult.

OBJECTS OF THE INVENTION

It is, therefore, the principal object of the present invention to provide a two-stage torsional elastic shaft coupling which utilizes the general principles of the prior art shaft coupling described, but which is free from many of the drawbacks thereof.

Another object of this invention is to provide an improved two-stage shaft coupling of a simpler and more economical construction, which can be assembled and disassembled or mounted and dismounted with greater ease and which is more reliable in operation.

SUMMARY OF THE INVENTION

These objects and others which will become apparent hereinafter are attained in a two-stage shaft coupling of the general type described but wherein between the hub and the walls of the opening a polygonal configuration is provided with inner and outer polygons, a first group of coupling elements being received between the polygon outer periphery of the hub and the polygonal inner periphery of the opening in the form of elastomeric bars or rods. Specifically, between a side of the outer polygon of the hub and a vertex of the inner polygon of the openings, a pocket is provided and each of these pockets receives a respective elastomeric bar.

According to the invention, moreover, each of the parts of the wall of the coupling flange bounding one of the elongated openings against which a projection or claw of the secondary force-transmitting member may impact is formed as an outer polygon and is lined with or cushioned by an elastic coupling body of a second group of coupling elements, there being axially overlap between the coupling elements of the two groups, i.e. the coupling of the invention is free from axial offset between the two groups of elastomeric coupling members.

A two-stage elastic shaft coupling, therefore, can comprise:

a drive-side body formed with a flange and a central polygonal opening surrounding an axis of rotation of the shaft coupling;

a driven-side body having a hub having a polygonal outer configuration received with clearance in the opening and a secondary torque transmitting member angularly fixed to the hub;

a first group of bar-shaped elastomeric coupling elements received between polygon surfaces of the opening and the hub and further compressible upon relative angular displacement of the bodies about the axis to transmit torque from the drive-side body to the driven-side body, the flange being formed outwardly of the opening with a plurality of angularly spaced windows elongated in a peripheral direction;

a respective projection on the secondary torque-transmitting member reaching into each of the windows and located with clearance from end flanks of the windows in low load torque transmission of the coupling; and a second group of elastomeric coupling elements disposed between the projections and leading ones of the flanks of the windows and elastically stiffer than the elements of the first group, whereby at low load torque transmission, the torque transmission is effected between the bodies exclusively by the first group of bodies and, upon higher load torque transmission, the second group of elements automatically engage between the leading flanks and the projections and transmit torque between the bodies, the second group of elements defining an outer polygon cooperating in torque transmission with the projections, the groups of elements being substantially concentric and axially overlapping.

It will be apparent that this coupling is materially simpler than the earlier coupling since it does not require any vulcanized connection between a metallic part and one of the elastic elements. It is also more reliable.

While rubber-roll couplings are known, they have not been provided to the best of my knowledge in a two-stage coupling of the integrated type I have described. This integration provides for a radial and axial disposition of the two grooves of elastomeric members free from any axial offsets so that one elastic stage is axially overlapped by the other elastic stage and the entire assembly can be very short in the axial sense.

According to another feature of the invention the shaft coupling ensures that metal parts will impact or drive one another exclusively through elastomeric parts so that jamming of metal parts together can be completely avoided. The coupling is to the highest degree wear resistant and maintenance free. Generally the polygonal configurations of the openings and the hub will be regular four-sided polygons, i.e. squares.

It has been found to be particularly advantageous to form a central coupling flange opening and the elongated opening with relatively thin wall segments and such that at each corner of the polygon of the central opening, a wall extends outwardly to form an end of an elongated opening. A skeleton-like coupling flange configuration is thus formed which is of exceptionally light weight and strength and which enables the entire coupling flange to have a substantially constant wall thickness facilitating the fabrication of complex coupling flanges as metal or plastic castings, especially of glass fiber-reinforced synthetic resin material.

In this construction, the central opening surfaces defining one regular polygon, the hub has surfaces defining a regular polygon with the same number of sides as the one regular polygon, the regular polygons are angularly offset from one another to define pockets at vertices of the one regular polygon opening toward a surface of the hub, and the bar-shaped elements are received with radial precompression in the pockets.

The secondary torque-transmitting element can be a flat disk directly connected to the hub. The disk can be formed with a polygonal hole while the hub has a polygonal external shape complementary to and received in the hole. The hub can then be secured to the disk around the hole by riveting or coining of the hub over a periphery of the hole.

The flanks defining the ends of the elongated openings or windows may be undercut to form pockets receiving the cushions of the second group of elastomeric members.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
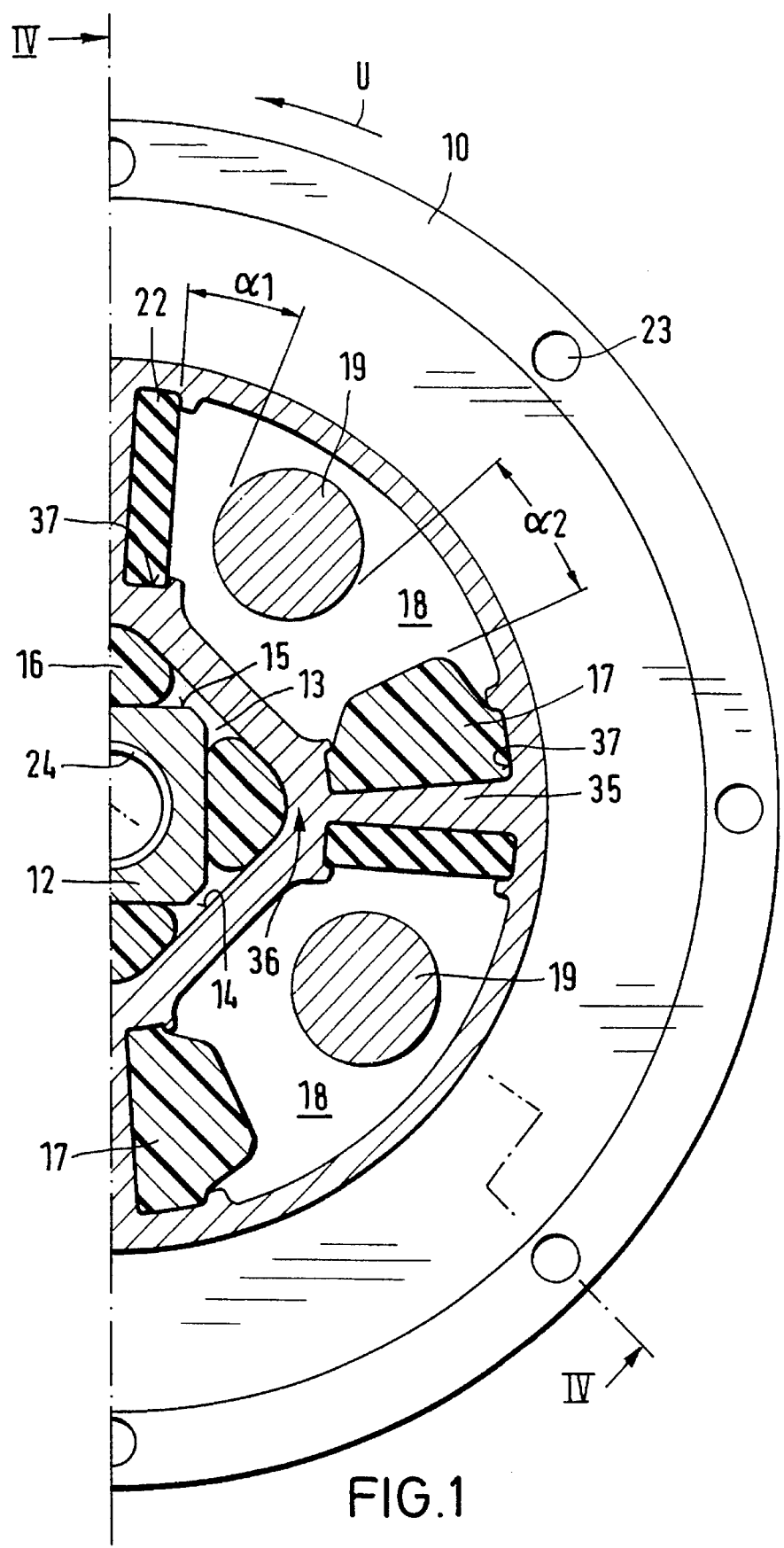
FIG. 1 is a partial elevational view partly in section in a plane perpendicular to the axis of a shaft coupling according to a first embodiment of the invention in a no-load state.

Each of the shaft couplings described herein encompasses a coupling flange 10 which forms the drive-side element coupling and can be connected via splines 24 with a shaft 11 at a hub 12, the shaft being part of a transmission or the like. The shaft and hub form the output or driven side of the coupling. As can be seen in highly diagrammatic form in FIG. 8A, the flange 10 can be connected by bolts 27 to a flywheel 28 of a shaft 29 driven by a motor of a boat or the like. A typical two-stage shaft coupling in according with the invention is shown in FIG. 8A in side-elevational view. In the remaining Figures the shaft coupling is shown either in a partial section in a plane perpendicular to the axis or in a section along an indicated section line.

Figure 12:
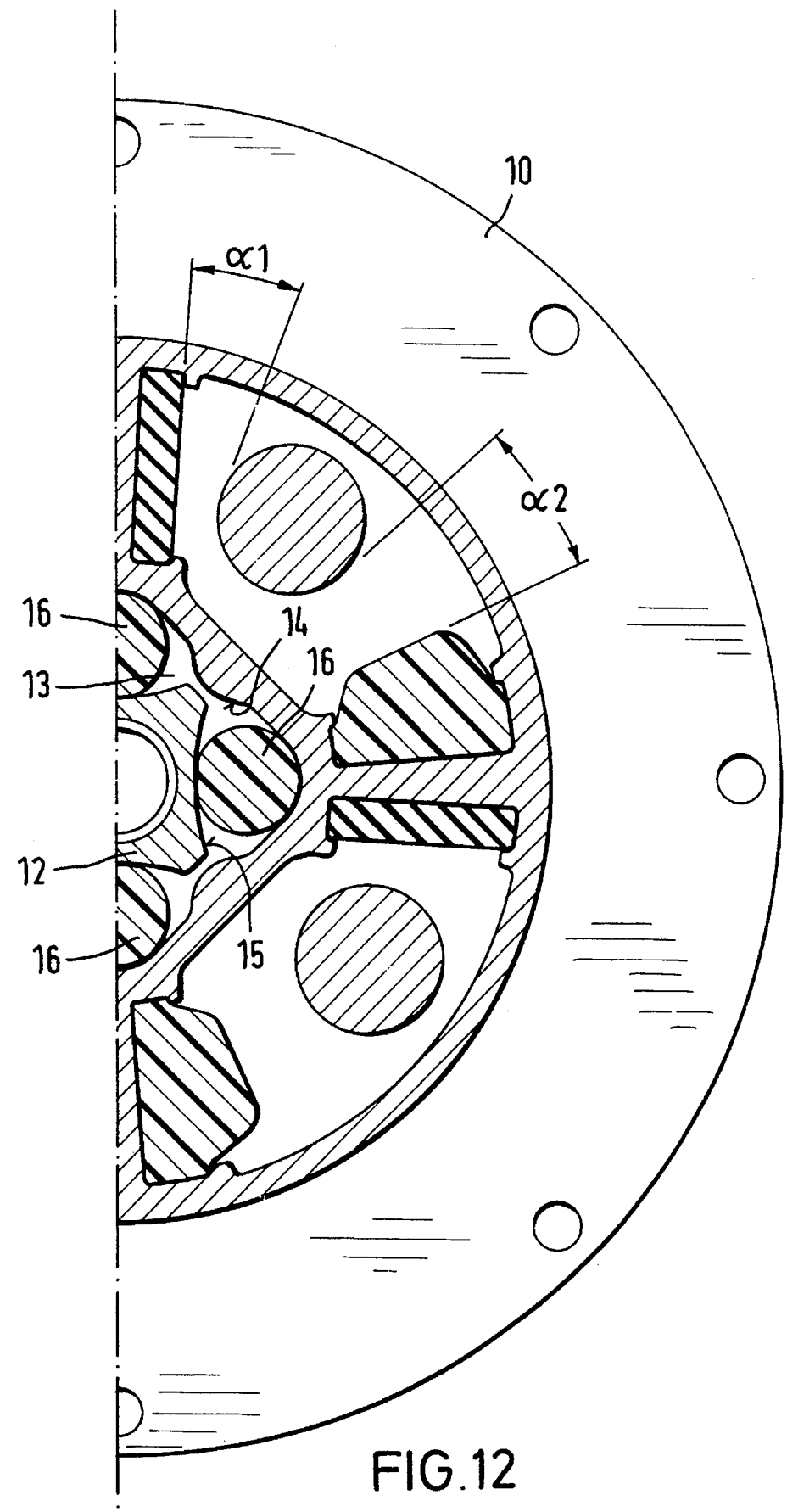
FIG. 12 is a view similar to FIG. 1 showing yet another embodiment with modified configurations of the polygonal opening and hub.

In all cases, in addition the coupling flange 10 has a central opening 13 with a polygonal outline or internal periphery 14. The hub 12 has a corresponding polygonal outline. The polygonal periphery of the hub is represented at 15 and the diameter of the hub (i.e. a diagonal of its polygon 15) and the side lengths of the surfaces of the hub polygon are shorter than the corresponding dimensions of the polygon of the opening. While in most of the embodiments the surfaces defining the polygon are flat, other configurations can be provided as shown in FIG. 12. The hub 12 may be composed of two or more parts, the inner part being keyed to the outer part and the outer part having the polygonal configuration (see for example FIG. 9).

The hub may also be made in one piece (see FIG. 1). Between the outer periphery 15 of the hub 12 and the inner periphery 14 of the coupling flange opening 13, rod-shaped, usually cylindrical elastomeric bodies 16 are forced into respective pockets defined between the surface of the hub 12 and a vertex of the polygon 14, the pockets being formed as shown at 13 by the angular offsetting of the flange and the hub. In the case of a four-sided polygon or square (FIGS. 1 and 2), this offset may be exactly 45° in the no-load condition of the coupling.

The elastomeric bodies 16 are under substantial radial precompression in the respective pockets, the compressive force and the resulting restoring force being sufficient to retain the flange and hub in their original positions after insertion of the compressed bodies 16 to prevent separation of these elements.

Figure 2:
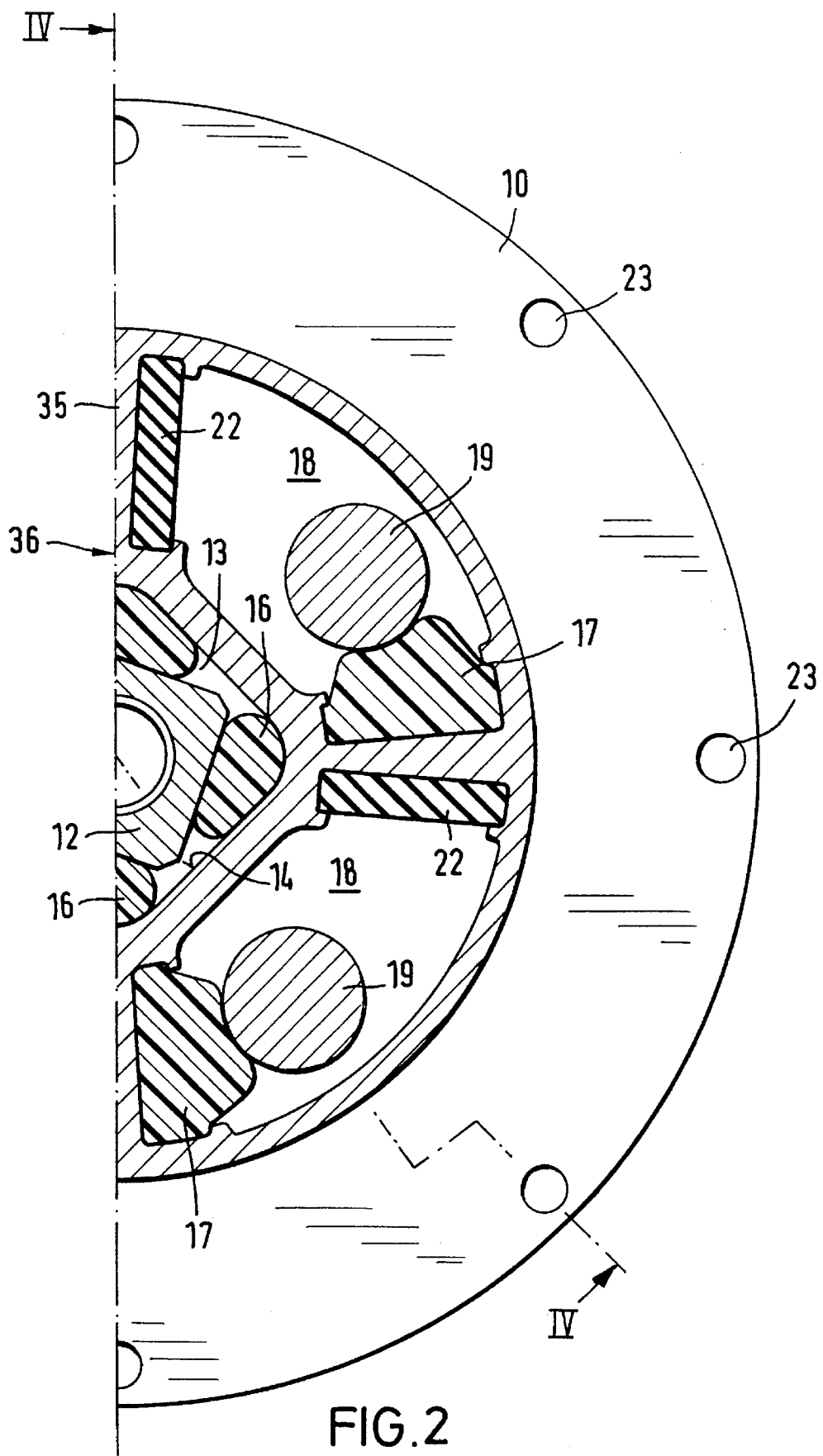
FIG. 2 is a section similar to FIG. 1 through the first embodiment with the coupling in a high-load state bringing into play a second state of elastomeric members.

In the embodiment of FIGS. 1 and 2, for example, four elastic coupling bodies 16 form a first group of the elastomeric coupling members and functionally replace the rubber ring bridging the hub and the flange of the prior art coupling.

If a torque is applied to the coupling flange 10 in the circumferential direction U (FIG. 1), the angular offset between the hub 12 and the flange will change (compare FIG. 2) and, with the elements 16 forming torsion springs, the hub 12 will be entrained in rotation.

With small loads or during idle, i.e. rotation of the flange 10 without a resistance on the shaft 11 or the hub 12, torque is transmitted to the hub exclusively through the elastomeric elements 16. The elements 16 are relatively pliable and constitute the first elastomeric coupling stage which damps oscillations below a certain load on the coupling.

With larger torques, loads and oscillation amplitudes, a second group of elastomeric coupling elements 17 intervenes in the force path. These elastomeric bodies 17 are disposed along trailing edges (in the rotational sense U) of windows 18 in the coupling flange. The elastomeric coupling bodies are engageable by the claws 19, formed as pins in the embodiment of FIG. 1, 2 and 4, on a disk-shaped secondary force-transmitting member 20 in the form of a disk angularly coupled to the hub 12.

Figure 4:
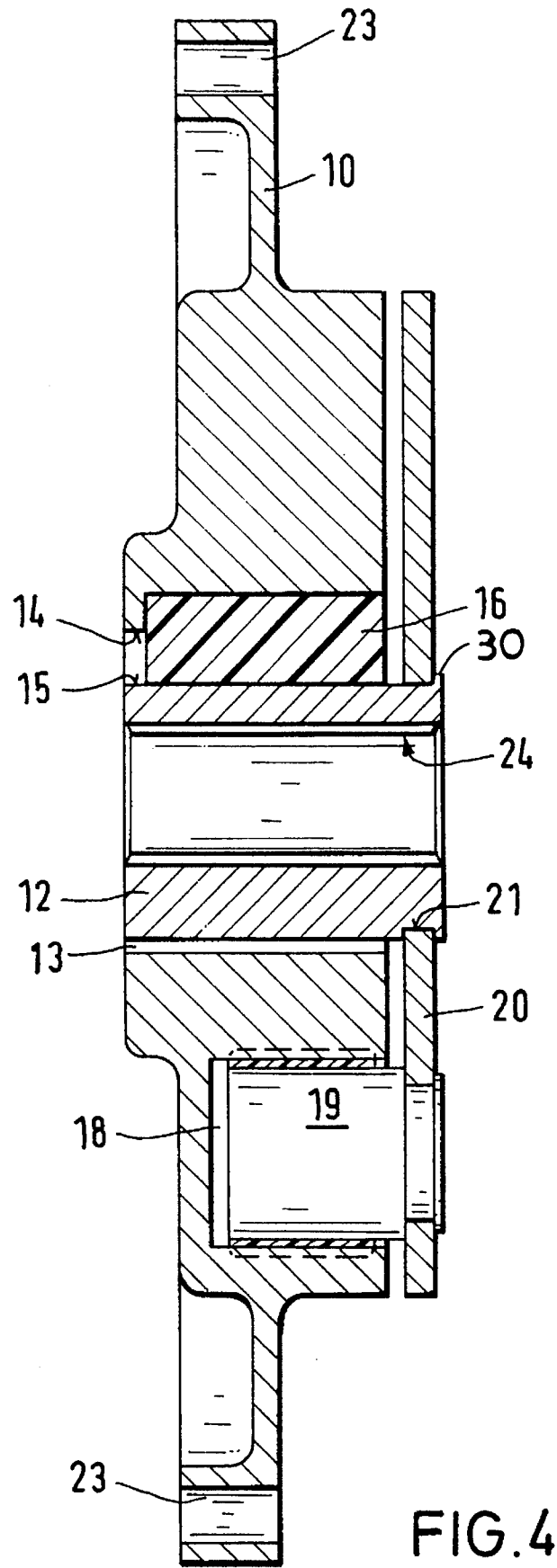
FIG. 4 is a cross sectional view taken along the line IV—IV in FIG. 1 and FIG. 2 with an embodiment in which the pin is provided with an elastomeric sleeve.

As can be seen from FIG. 4, the secondary force-transmitting disk 20 can have a polygonal opening 21 in which the polygonal outer periphery of the hub 12 is received so that the hub and disk are angularly coupled, the hub 12 being riveted or coined to form a head 30 over the disk 20. A similar connection between the hub and the disk is apparent from FIGS. 6 and 8 as well.

As long as the coupling flange 10 and the hub 12 rotate in an idle mode or at partial loading, the elastomeric elements 16 of the first group damp the oscillations. When the oscillations achieve a greater amplitude with increasing rotary speeds and torques, there is an increasing approach of the claws 19 toward the elastomeric members 17 of the second group until the claws 19 impact upon these cushions, thereby placing them in the force-transmitting path. This condition is shown in FIG. 2.

To allow the elastic capacity of the first coupling stage to be fully utilized, the play of the claws 19 as represented at $\alpha 1$ and $\alpha 2$ should be sufficient to fully exploit the yieldable characteristics of members 16. Impact in the forward direction with plate-like flat elastic stops 22 serves to prevent metallic contact of the relatively moving parts whereas the impact with the cushions 17 damp oscillations. The claws may impact against either the elastomeric bodies 17 and 22 alternately in a resonance operation transiently. The torsional elastic shaft coupling of the invention has a simple construction, excludes metal-to-metal contact and also precludes jamming, galling and corrosion resulting from metal-to-metal contact. Mounting by screws or bolts through the holes 23 is simple. The elastic coupling bodies 17 and 22 can be simply inserted axially in the receiving pockets 37 and retained there in a force-fit or form-fit.

The torsionally elastic characteristics of the coupling are highly advantageous. The initial stage represented by the elastic coupling bodies 16 is highly elastic and has a progressive characteristic with a relatively shallow slope. The second stage, represented by the elastomeric cushions 17, has a sharply steeper characteristic and in effect takes over the torque transfer from an intermediate load to full load operation. The first stage should be effective up to 10% of a nominal torque of the coupling while the second stage should be able to transmit substantially 90% of the nominal torque.

Figure 3:
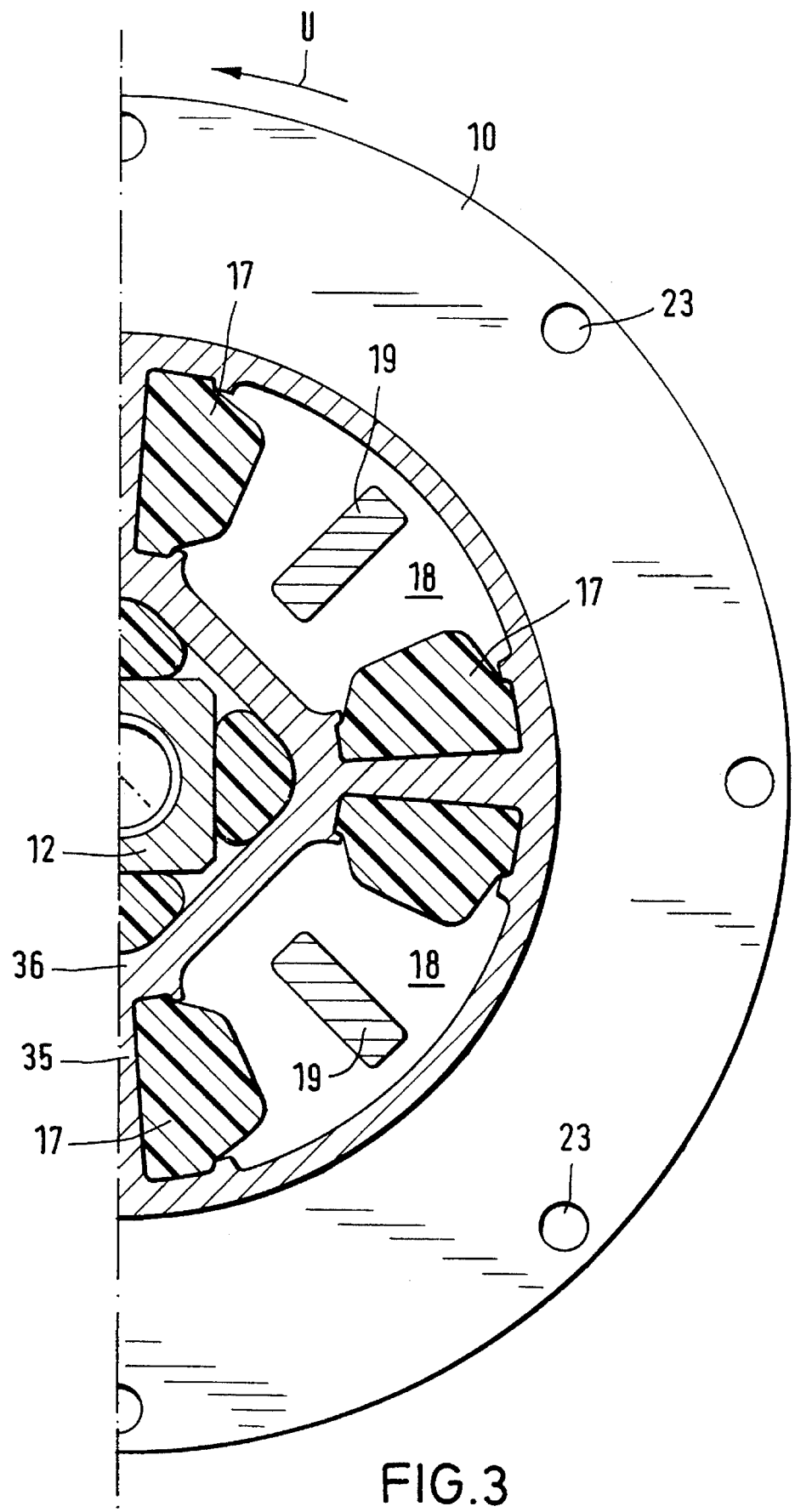
FIG. 3 is a view similar to FIGS. 1 and 2 of a modified embodiment.

The embodiment of FIG. 3 differs from that of FIGS. 1 and 2 in that the claws or pins in this embodiment are relatively flat ribs of generally rectangular cross section and not cylindrical pins. The functional difference is that the damping of the shaft coupling of FIG. 1 begins upon engagement of the pins with the cushions 17 in a somewhat softer manner because of the smaller surface of the cushion initially engaged by the pin. By contrast with the flat ribs of FIG. 3, a larger area of the cushion 17 is initially engaged when the second group of elastomeric bodies is brought into play.

The embodiments of FIGS. 1 and 3 differ, moreover, in that in FIG. 3 the ribs 19 are disposed centrally between a pair of cushions at the ends of the respective windows 18 but in the embodiment of FIG. 1, the rest position of the pin 19 in each window is closer to the elastomeric member 22 than the respective cushion 17. The embodiment of FIG. 3, therefore, is more effective when symmetrical displacement is intended, i.e. when the shaft coupling is to be used in alternating directions.

Figure 5:
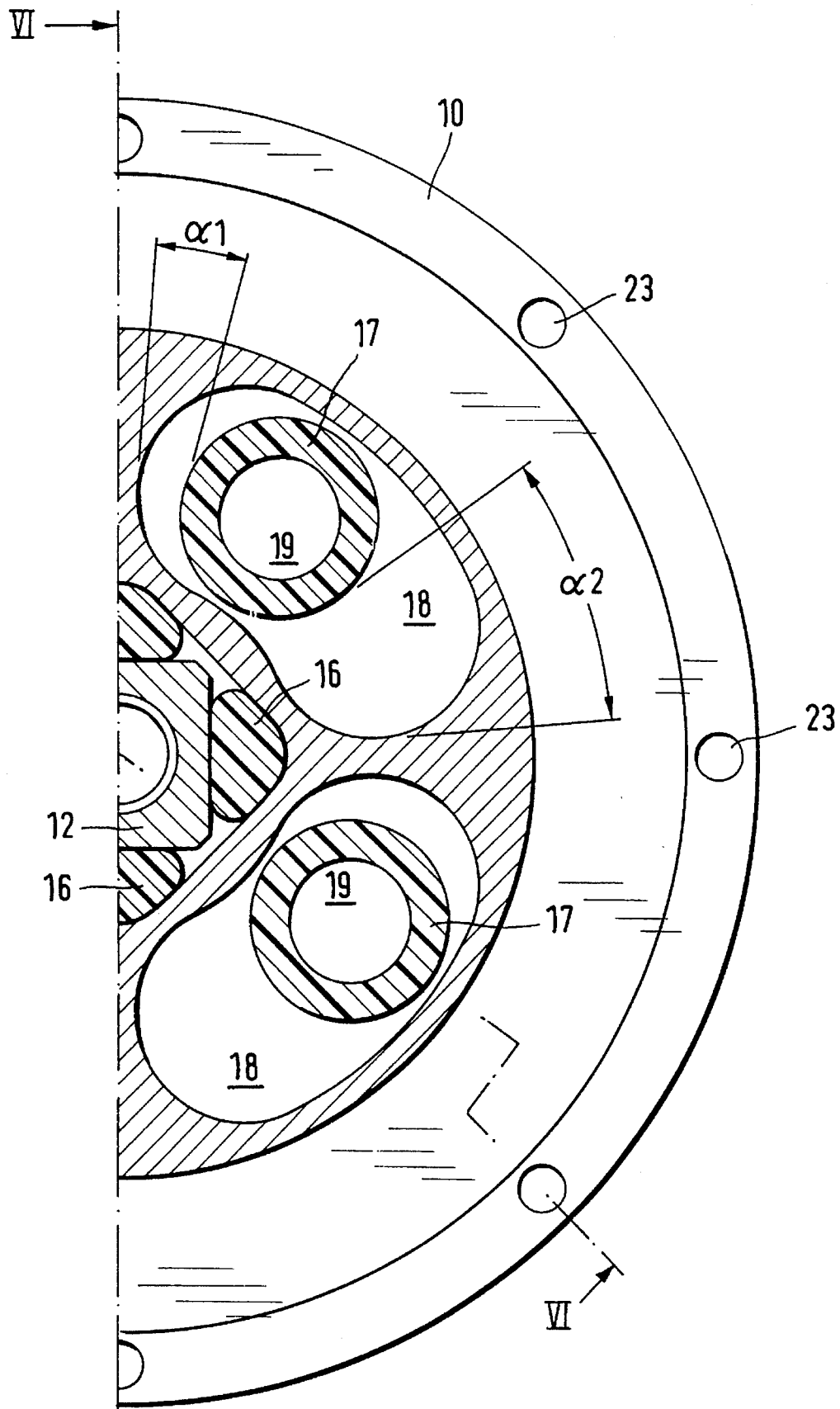
FIG. 5 is a view similar to FIG. 1 of another embodiment.
Figure 6:
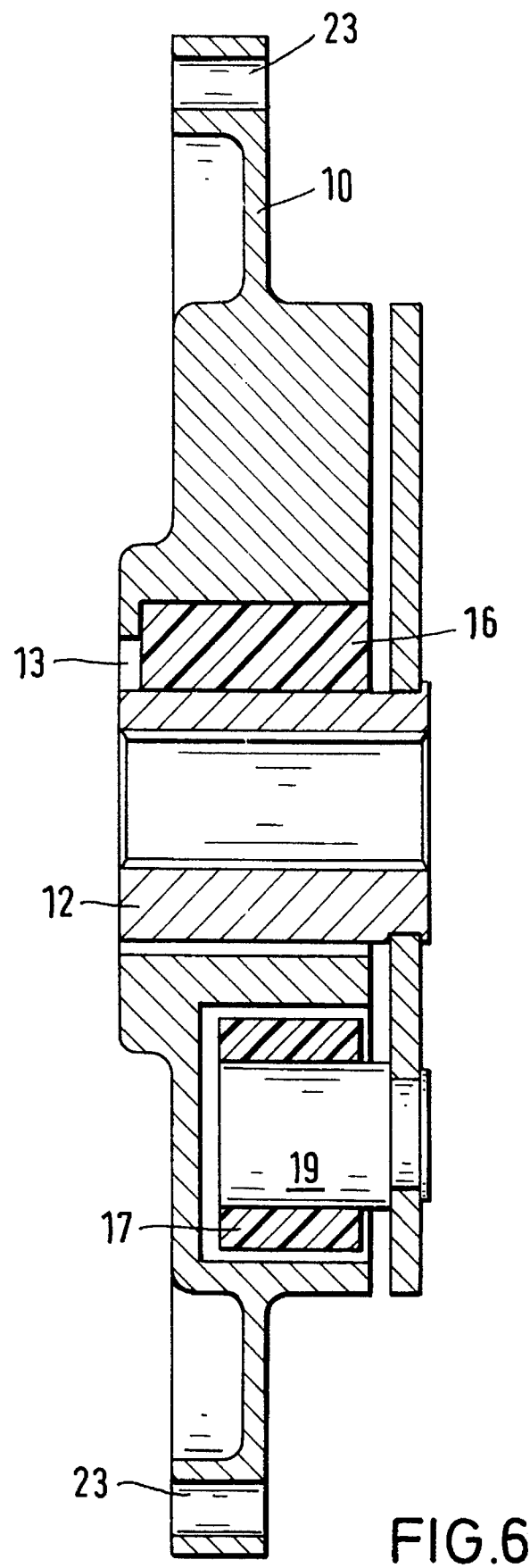
FIG. 6 is a cross sectional view taken along the line VI—VI of FIG. 5.

In the third embodiment of FIGS. 5 and 6, the elastomeric coupling bodies 17 of the second group are not directly applied to the flanks or ends of the elongated windows 18, but rather are provided as sleeves on the pins 19. The sleeves may be pressed onto the pins. The rest orientation of the pins is such as to provide a greater ratio $\alpha 2:\alpha 1$. An advantage of this embodiment is the simplicity of the shape of the elastic bodies as well as the simple configurations of the kidney-shaped windows 18.

In all of the embodiments described thus far, the coupling flanges 10 can be attached to a driving part of the apparatus, namely the flywheel, by the peripheral bores 23 and the screws which traverse them. The hub 12 can be keyed to the shaft 11 or connected 24 thereto by a spline connection or an involute mating profiling as is desired.

Figure 7:
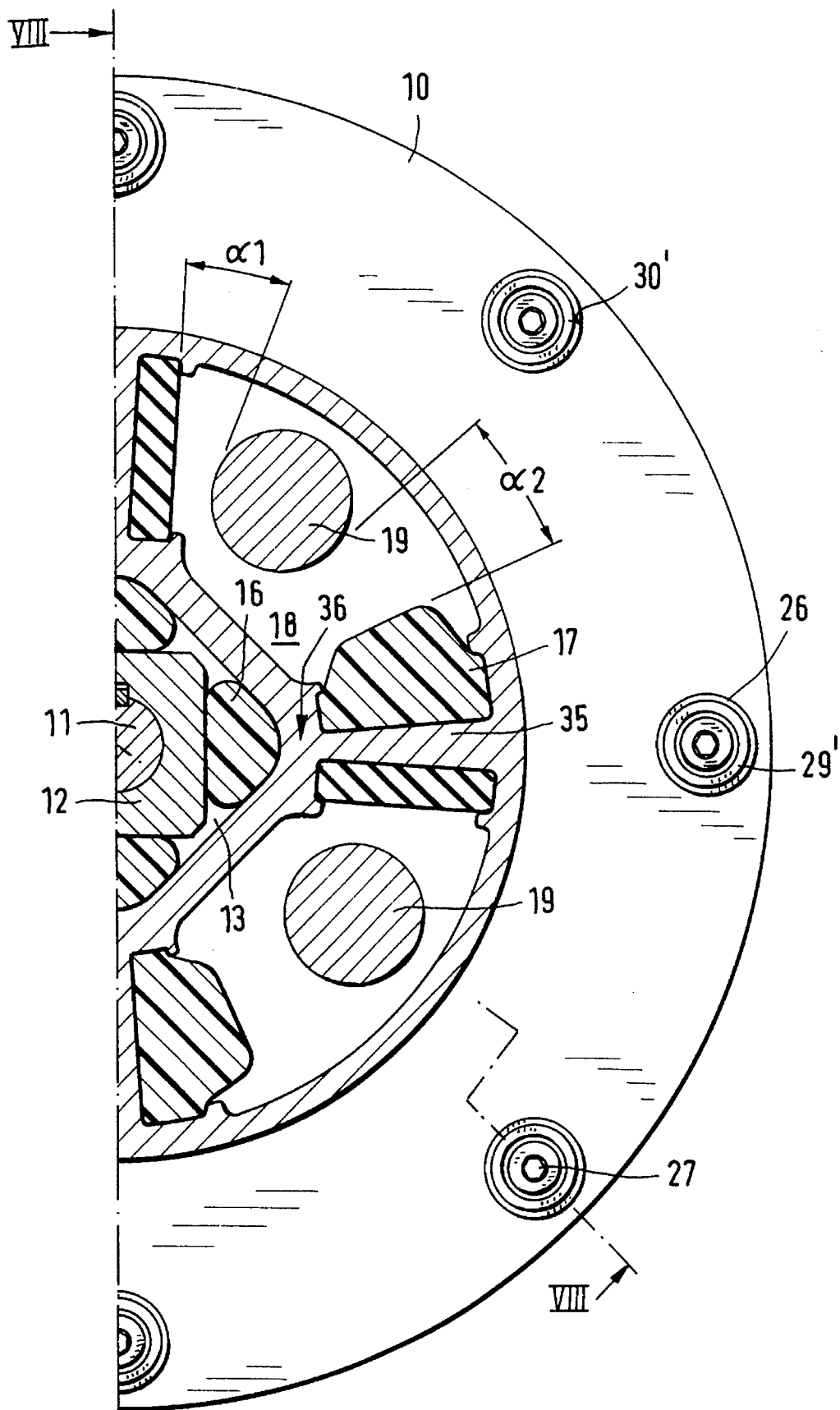
FIG. 7 is another view similar to FIG. 1 showing yet another embodiment.
Figure 8:
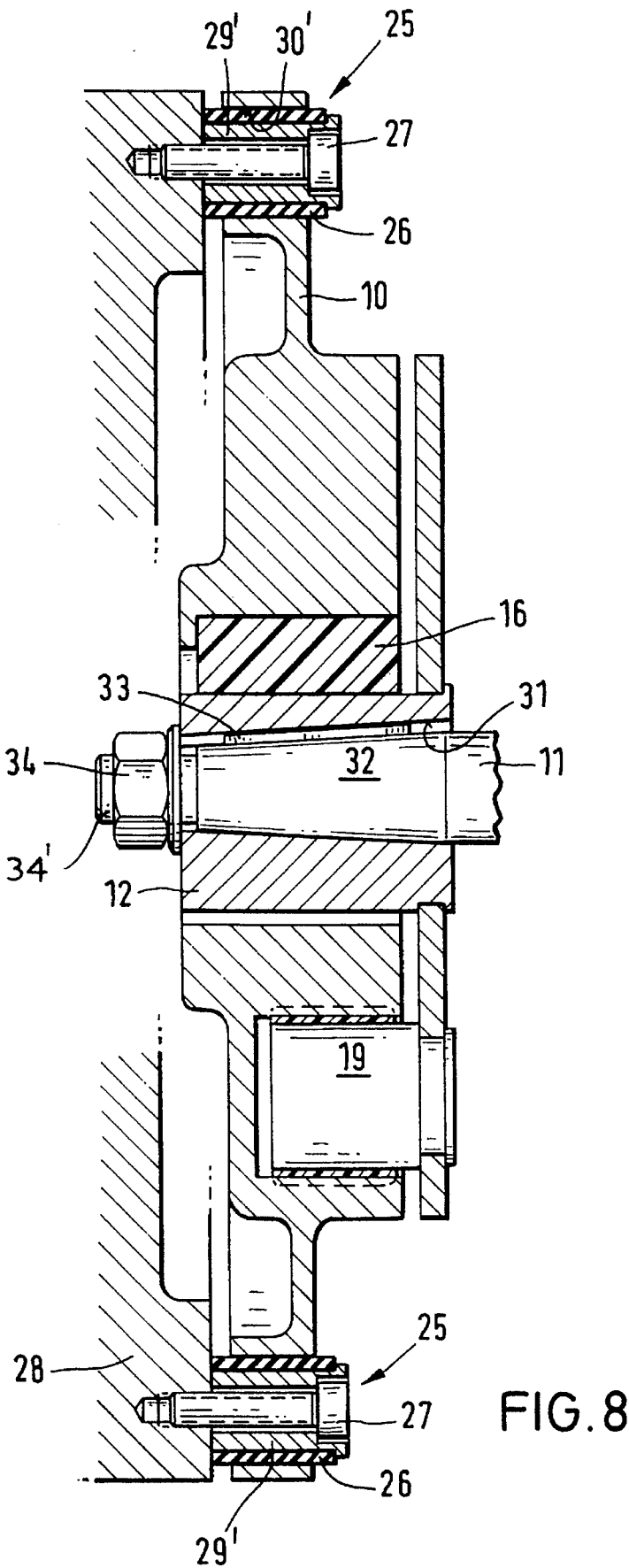
FIG. 8 is a cross sectional view taken along the line VIII—VIII of FIG. 7.
Figure 8A:
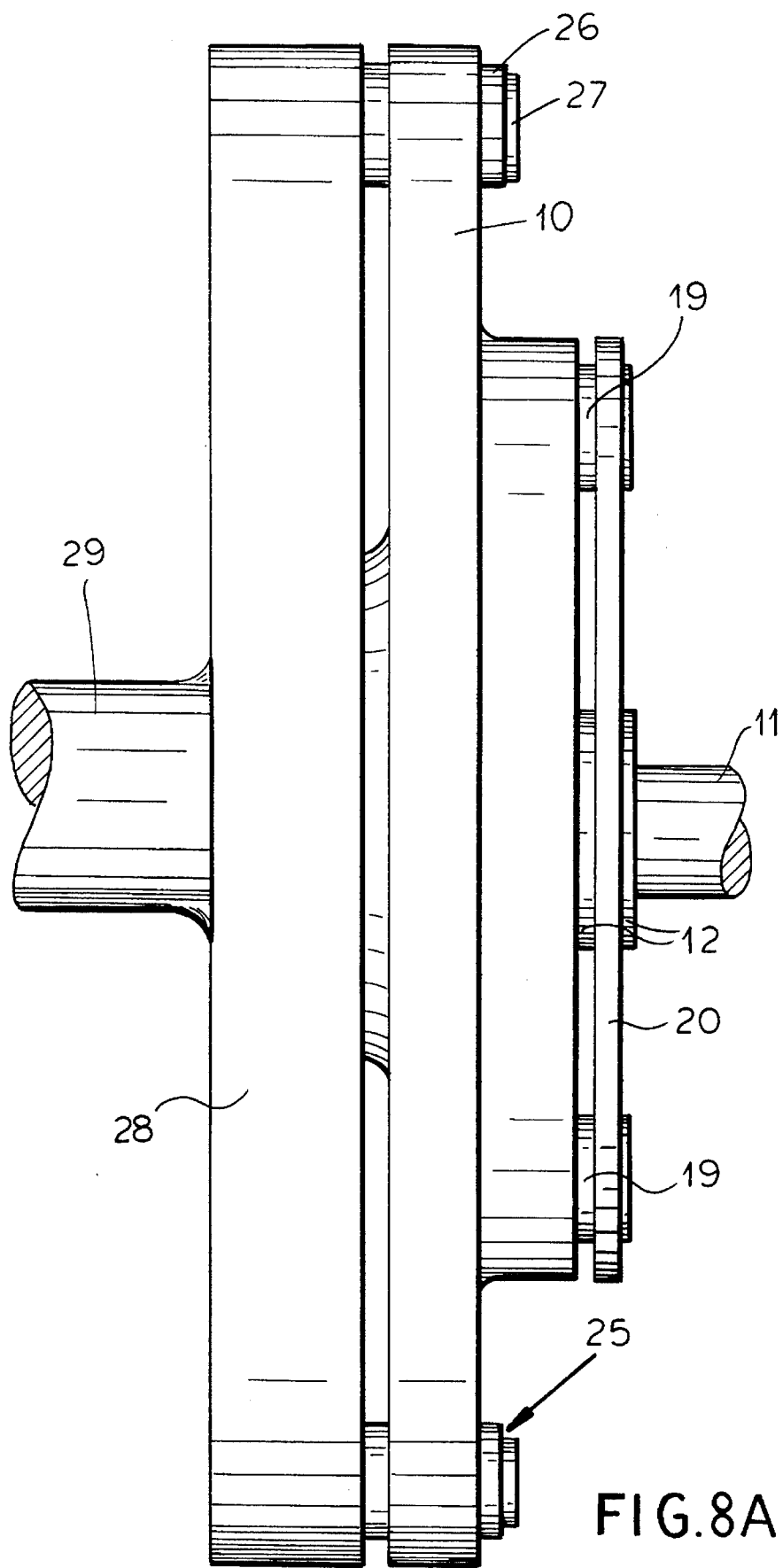
FIG. 8A. is a side view of the coupling of FIG. 8.

In the embodiment of FIGS. 7 and 8, which utilizes the principles described with respect to FIGS. 1 and 4, the axial assembly of the coupling is effected with the aid of elastic connectors 25 each comprised of a rubber sleeve 26 traversed by a screw 27 and a spacer sleeve 29' which affixes the periphery of the flange 10 to the flywheel flange 28. The rubber sleeves 26 have the function of compensating for fabrication tolerances and preventing metal-to-metal contact between the components of the shaft coupling and the flywheel. The bores 30' along the periphery of the flange can be simply forced over the rubber sleeves 26 for assembly of the flange 10 to the flywheel.

The receiving bore 31 of the hub 12 is, in this embodiment, of conical configuration and mates with a cone 32 at the end of the shaft 11, a nut 34 threaded onto the threaded end 34' of the shaft clamping the hub 12 on the cone. A key 33 angularly connects the shaft with the hub 12 and is received in the key groove 31 of the hub 12. This construction provides a reliable and secure fastening of the hub on the shaft.

Figure 9:
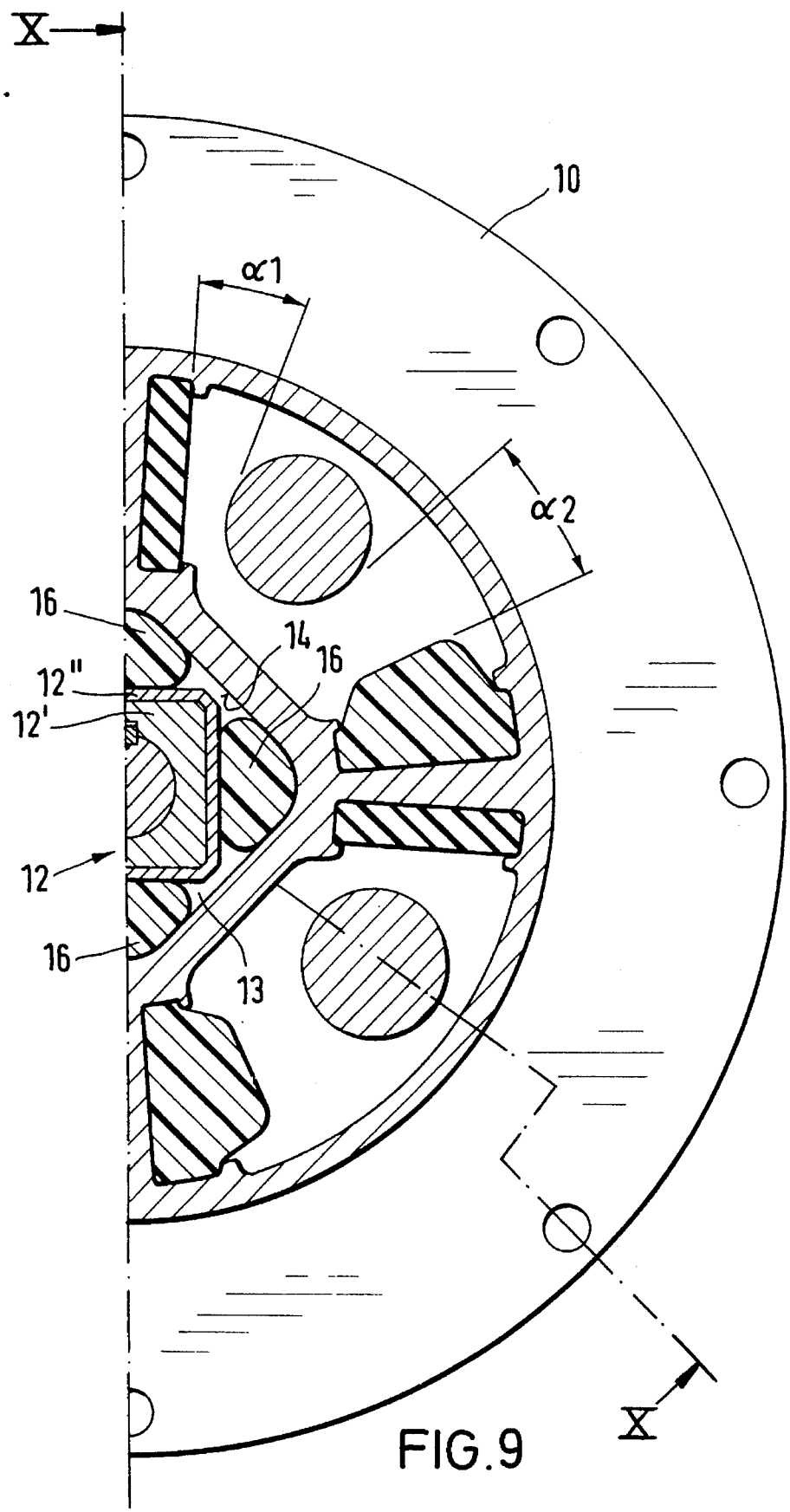
FIG. 9 is a view similar to FIG. 1 of an embodiment using a two-part hub.
Figure 10:
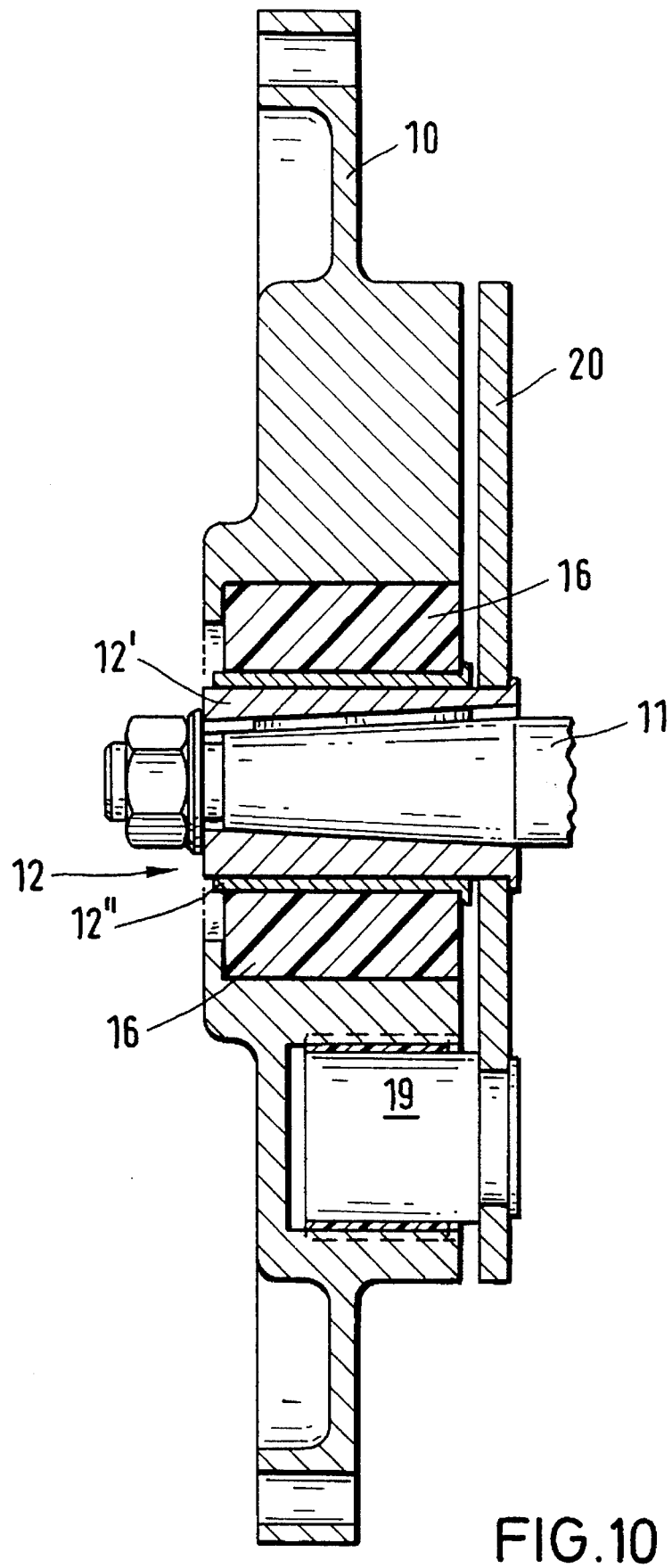
FIG. 10 is a cross sectional view taken along the line X—X of FIG. 9.
Figure 11:
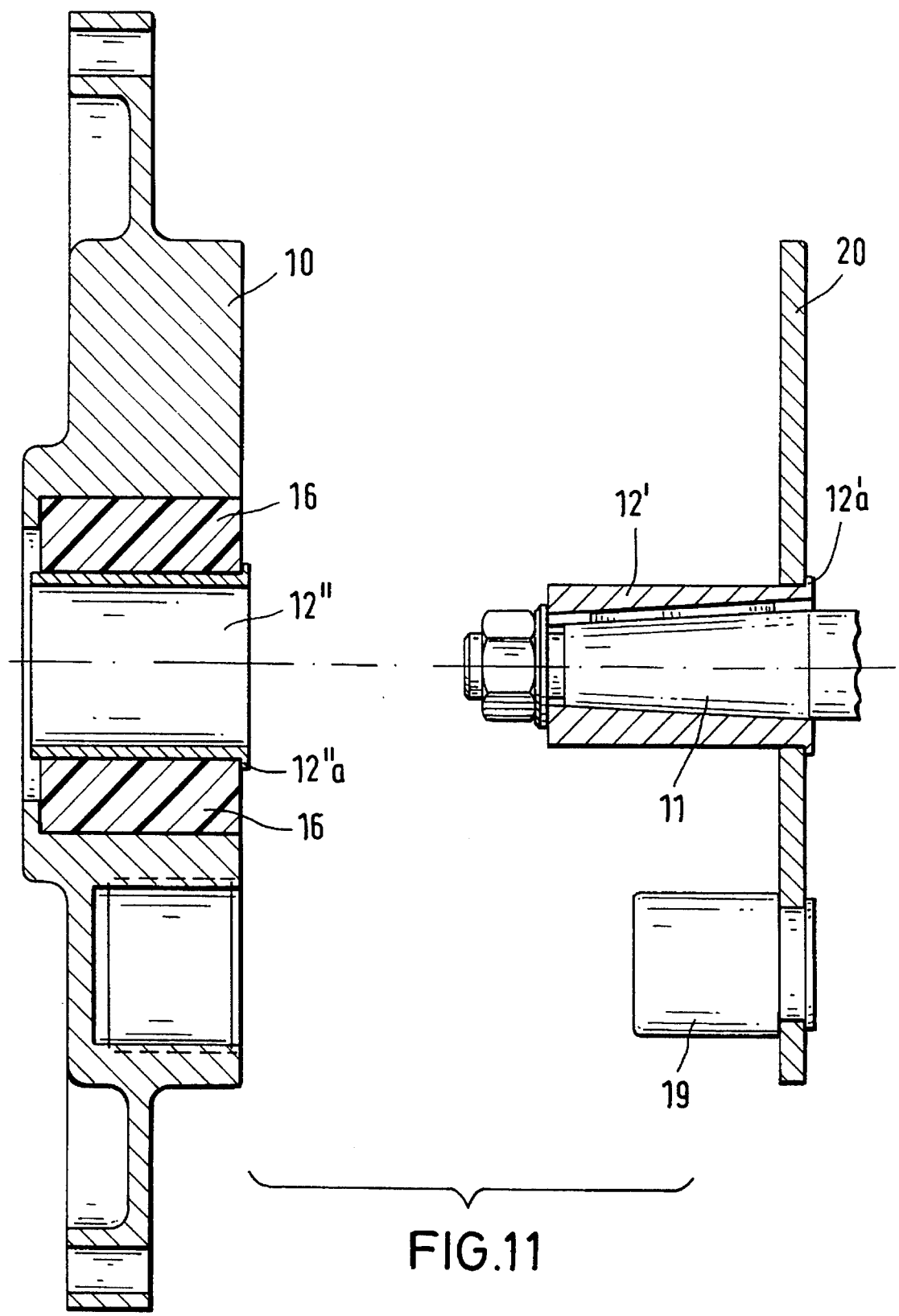
FIG. 11 is a section corresponding to FIG. 10 in an exploded view showing the parts disassembled.

FIGS. 9–11 show a coupling whose hub 12 is subdivided into an inner body 12' affixed to the shaft 11 and an outer body 12" in the form of a sleeve.

The hub sleeve 12" forms a component of the first coupling stage and braces the inner coupling body 16 (see FIG. 11). The central body 12' and the sleeve 12" are matched in shape so that the central body 12' can slide axially in the sleeve 12" and is angularly connected therewith without play. These portions of the hub have shoulders 12'a and 12"a for axially locating the portions of the sleeve in the respective parts of the coupling as can be seen from the exploded view of FIG. 11. AS can be seen from this Figure, therefore, the sleeve 12" is mounted in the flange 10 to brace the elastomeric members 16 while the central body 12' is mounted on the disk 20 with the claws 19 and the two parts are then assembled by displacing the central member 12' into the sleeve 12" toward the engine of the boat.

The polygonal patterns need not be defined by perfectly flat sides as will be apparent from FIG. 12 where the surfaces 15 of the hub are concave and the pockets 13 are defined by rounded flanks of the inner polygon 14. In this configuration the elastomeric members 16 can retain their circular configuration until the torque is applied, whereupon the shapes of the polygons prevent extrusion of the elastomeric members in either direction from the respective pockets. With this configuration the damping characteristic is somewhat steeper than in the embodiments previously described. The members 16 can be provided here without radial precompression or with only a slight radial compression so that the damping characteristic is softer to start with and then becomes stiffer more rapidly than with the embodiment of FIG. 11.

The secondary force-transmitting member 20 can, if desired, be overdimensioned so that it can function as a flywheel and adjustment of the moment of inertia of the secondary element is advantageous since it can shift the resonance point of the coupling.

In general the webs 35 separating the openings 18 can extend from the vertices 36 of the walls defining the polygon 14, thereby allowing the wall thicknesses of the flanges to be more or less uniform.

I claim:

1. A two-stage elastic shaft coupling comprising:
   a drive-side body rotatable about an axis and formed with
      a radial projecting flange,
         a central polygonal-section opening centered on the axis and having radially inwardly directed surfaces, and
         a plurality of angularly spaced and angularly elongated windows having end flanks and located radially outward of the opening;
   a driven-side body having
      a hub having a polygonal outer configuration received with clearance in said opening and having radially outwardly directed surfaces disposed within the inwardly directed surfaces of the drive-side body, the inwardly and outwardly directed surfaces being offset with respect to each other to define pockets therebetween, and
      respective projections reaching into the windows and located with clearance from the end flanks of the windows in low load torque transmission of the coupling;
   an inner group of solid elastomeric coupling elements received in the pockets, angularly spaced about the axis, and compressible upon relative angular displacement of said bodies about said axis to transmit torque from said drive-side body to said driven-side body; and
   an outer group of elastomeric coupling elements angularly disposed between said projections and leading ones of said flanks of said windows and elastically stiffer than the elements of said inner group, the outer group of elements axially overlapping the inner group of elements, whereby at low load torque transmission the torque transmission is effected between said bodies exclusively by said inner group of elements and, upon higher load torque transmission, said outer group of elements automatically engage between said leading flanks and said projections and transmit torque between said bodies along with the inner group.

2. The two-stage shaft coupling defined in claim 1 wherein said opening has surfaces defining one regular polygon, said hub has surfaces defining a regular polygon with the same number of sides as said one regular polygon, said regular polygons are angularly offset from one another to define pockets at vertices of said one regular polygon opening toward a surface of the hub, and said solid elements are received with radial precompression in said pockets.

3. The two-stage shaft coupling defined in claim 1 wherein said regular polygons are four-sided polygons.

4. The two-stage shaft coupling defined in claim 1 wherein said opening is defined by thin wall segments of said flange, said flanks are defined by thin wall segments of said flange, and a thin wall segment of flanks separating two of said windows meets thin wall segments defining said opening at a vertex of a polygon formed by the thin wall segments defining said opening.

5. The two-stage shaft coupling defined in claim 1 wherein the driven-side body has a flat disk directly connected to said hub and carrying the projections.

6. The two-stage shaft coupling defined in claim 5 wherein said disk is formed with a polygonal hole, said hub has a polygonal external shape complementary to and received in said hole and said hub is secured to said disk around said hole by riveting or coining of the hub over a periphery of said hole.

7. The two-stage shaft coupling defined in claim 1 wherein said elements of said outer group are sleeves surrounding the respective projections and engageable with said leading flanks.

8. The two-stage shaft coupling defined in claim 1 wherein said elements of said outer group are cushions fitted into pockets in said flanks at opposite ends of said windows.

9. The two-stage shaft coupling defined in claim 8 wherein said projections are disposed substantially midway between the cushions on the flanks of the respective windows in an unloaded state of the coupling.

10. The two-stage shaft coupling defined in claim 8 wherein said projections in an unloaded state of the coupling assume rest positions offset from centers of said windows in a direction of rotation of said drive-side body.

11. The two-stage shaft coupling defined in claim 1 wherein said elements of said outer group are cushions on said leading flanks, the other of said end flanks for each window being provided with a flat elastomeric plate engageable by the respective projection.

12. The two-stage shaft coupling defined in claim 11 wherein said projections in an unloaded state of the coupling assume rest positions offset from centers of said windows in a direction of rotation of said drive-side body.

13. The two-stage shaft coupling defined in claim 1 wherein said hub is formed with an inner part connected to said shaft and a tubular polygonal sleeve axially slidably receiving and closely fitting onto said hub and angularly coupled therewith.

14. The two-stage shaft coupling defined in claim 13 wherein said sleeve is composed of a synthetic resin.

15. The two-stage shaft coupling defined in claim 14 wherein said sleeve is composed of a polyamide.

16. The two-stage shaft coupling defined in claim 1 wherein said driven-side body is formed as a flywheel.

\* \* \* \* \*